Aug. 8, 1933.  W. R. MORRISON  1,921,318
REFRACTION INSTRUMENT
Filed March 21, 1932  3 Sheets-Sheet 1
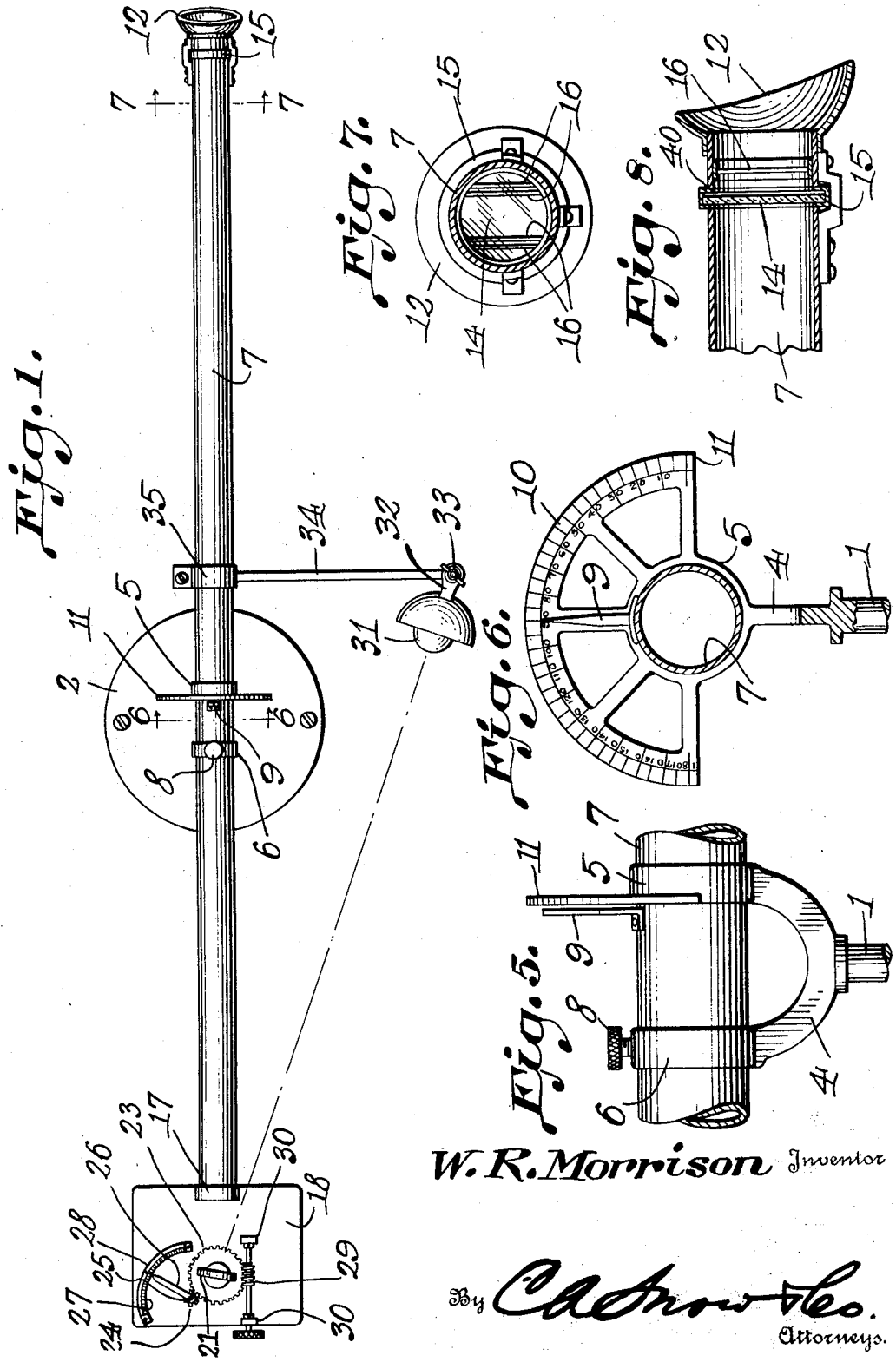
W. R. Morrison, Inventor Aug. 8, 1933.  W. R. MORRISON  1,921,318
REFRACTION INSTRUMENT
Filed March 21, 1932   3 Sheets-Sheet 2
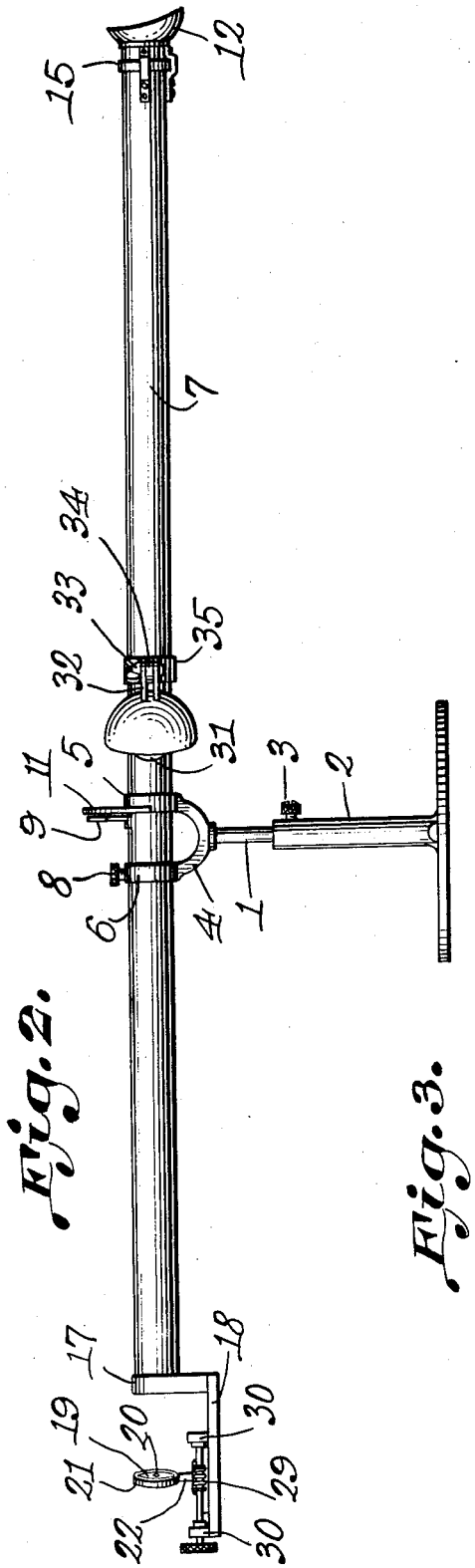
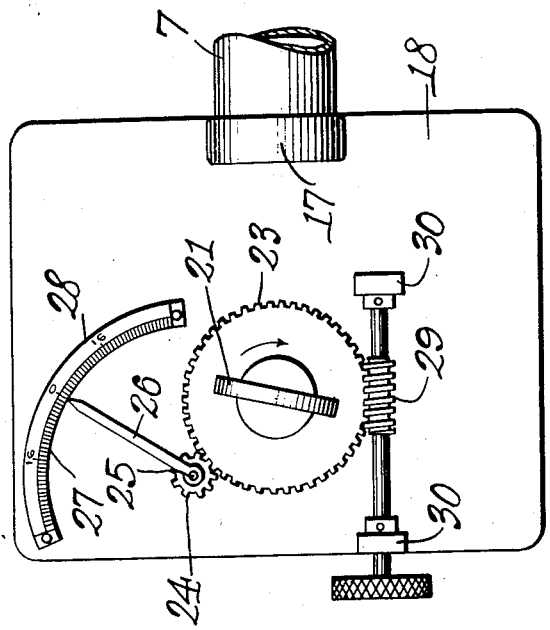
W. R. Morrison Inventor

Aug. 8, 1933.  W. R. MORRISON  1,921,318
REFRACTION INSTRUMENT
Filed March 21, 1932   3 Sheets-Sheet 3

W. R. Morrison Inventor

By C. A. Snow & Co.
Attorneys.

Patented Aug. 8, 1933

1,921,318

UNITED STATES PATENT OFFICE 1,921,318

REFRACTION INSTRUMENT

William R. Morrison, Billings, Mont.

Application March 21, 1932. Serial No. 600,307

4 Claims. (Cl. 88—20)

This invention aims to provide a simple instrument, operating upon the principles of a retinoscope, for determining the nature of the correcting lens that is to be used in spectacles for the human eye.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Fig. 1 shows in top plan, a device constructed in accordance with the invention;

Fig. 2 is a side elevation;

Fig. 3 is an enlarged top plan of the platform and the parts associated with it;

Fig. 4 is an end elevation of the structure depicted in Fig. 3;

Fig. 5 is an elevation enlarged from Fig. 2;

Fig. 6 is a cross section on the line 6—6 of Fig. 1;

Fig. 7 is a cross section on the line 7—7 of Fig. 1;

Fig. 8 is a fragmental longitudinal section at the patient's end of the sight tube;

Figure 9:
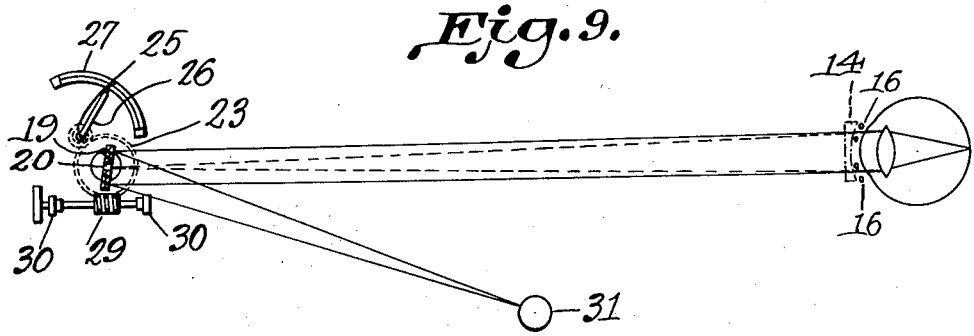
Figs. 9 to 17 are diagrams referred to in explaining the operation of the instrument.

For the convenience of patient and observer, so far as gross adjustment for vertical height is concerned, the working parts of the instrument may be carried by a standard 1, vertically adjustable in a base 2 of any style and height, the standard being held in adjusted position by a set screw 3 in the base. There is a fork 4 at the upper end of the standard 1, and the fork is supplied with ring bearings 5 and 6.

In the ring bearings 5 and 6, a horizontal sight tube 7 is mounted for rotary adjustment about its longitudinal axis. A set screw 8, threaded into the bearing 6, may be employed to hold the tube 7 in any position to which it may have been rotated; although whether or not the set screw is used, will depend upon whether the operator wishes to avoid the clamping error which is well known to all who work with instruments of precision wherein set screws are embodied.

On the sight tube 7 is fixed a hand 9, adapted to cooperate with a scale 10 on a transverse limb 11 fixed to the bearing 5, the limb being calibrated in degrees of arc from zero to 180 degrees, as shown in Fig. 6.

The patient's eye piece 12 may be mounted on one end of the sight tube 7 in any desired way. It embodies no lenses, and, in general, is circumscribed by no limitations other than that it should exclude extraneous light with a reasonable degree of perfection, and produce no distracting discomfort to the patient.

Figure 12:
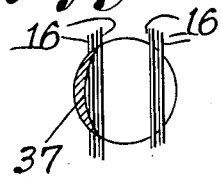

A slot 40 is formed in the tube 7 for the reception of a holder 15 carrying a cylindrical lens 14, located adjacent to the eye piece 12. The purpose and the adjustment of the lens 14 will be referred to hereinafter. The operation of the instrument is predicated upon the well-known shadow test. Ordinarily, the edge of the shadow is concaved or crescentic, as shown in Fig. 12, but by using a cylindrical lens, such as the lens 14, the edge of the shadow may be made to appear straight, as disclosed in Fig. 14, it being possible, thus, to make a more accurate observation of the shadow than would be possible otherwise, the observation of the shadow being something which will be taken up hereinafter.

Cross wires 16 are mounted in the tube 7, between the lens 14 and the part 12, and as close as convenient to the eye to be examined. The cross wires 16 are arranged in parallel relation. They are also disposed in two sets, the space between the sets being much greater than the space between the cross wires of each set. The purpose of the cross wires 16 is to establish a standard and fixed distance across which the shadow moves for all eyes.

An angle bracket 17 is secured to the observer's end of the sight tube 7, and embodies a platform 18, of any desired size and shape, arranged below the axis of the tube and parallel thereto.

The mirror 19 has a sight hole 20, and is carried by a frame 21, the vertical shaft or stem 22 of which is journaled in the platform 18. Secured to the shaft 22 is a gear 23, meshing with a pinion 24 which is secured to a shaft 25, journaled in the platform 18. An indicator 26 is secured to the shaft 25, and is adapted to cooperate with an arcuate dial 27 on the platform 18, the units of calibration on the dial being marked by the numeral 28. The indicator 26 is moved simultaneously with the tilting or so-called "rotation" of the mirror 19, by the shaft 25, the pinion 24, the gear 23, and a tangent screw 29, under the control of an operator, the tangent screw meshing with the gear 23, and being journaled in bearings 30 on the platform 18. The parts 26 and 27 indicate the movement of the mirror 19, and it is from a reading on the calibrations 28 of the dial 27 that there is derived a reading from which the refraction of the eye is computed, as explained in a subsequent paragraph.

The source of illumination for the mirror 19 may be an electric bulb 31, the holder 32 of which is adjustably secured at 33 to a lateral arm 34 mounted by means of a clamp 35, or otherwise, on the sight tube 7.

The light from the bulb 31 is reflected by the mirror 19 through the sight tube 7 into the patient's eye, and is reflected by the retina, back through the pupillary opening, the presumption being that the light from the retina is a pupillary reflex, and it being unnecessary, for the purposes of this description, to enter into any discussion of the question as to whether or not the patient's retina itself becomes a source of illumination.

Figure 14:
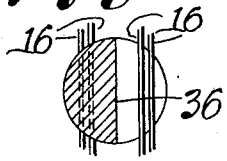

As has been mentioned hereinbefore, the tube 7 is slotted at 40, to provide for the insertion of the cylindrical lens 14, and the office of this lens is to rectify the edge of the shadow, the edge of the shadow being rendered straight, as shown at 36 in Fig. 14, instead of crescentic, as shown at 37 in Fig. 12, it being possible to make a more accurate observation of the shadow with respect to the cross wires 16, if the shadow has a straight edge, than could be done if the shadow had the crescentic edge 37. The lens 14 is the only lens used in the instrument, there being no neutralizing or "working equivalent" lens to equalize the distance at which the operator is working. The length of the tube 7 is such, and the mirror 19 is so placed, that the distance between the eye of the observer and the eye of the patient is one meter. If a plus lens of one diopter were used as a working equivalent or neutralizing lens, and if the eye under examination were emmetropic, the emergent rays reflected from the patient's retina through his pupillary opening, would have their point of reversal at the sight-hole of the mirror 19, as shown in Fig. 9, and there would be no shadow: but since no working equivalent lens is employed, even an emmetropic eye will manifest the shadow phenomenon, when examined by means of the instrument herein disclosed. The amount of movement of the shadow in an emmetropic eye at a distance of one meter from the observer, without a working equivalent lens, is made the standard from which lens corrections for eyes that are not normal, are computed.

If the amount of movement of the shadow in an emmetropic eye is to be the standard of comparison, it is evident that some definite unit of measurement for the movement of the shadow must be provided, and that unit is afforded by the distance between the pairs of cross wires 16. That distance having been determined arbitrarily, and the cross wires 16 having been set accordingly, it is clear that when the tangent screw 29 is rotated enough to tilt the mirror 19 sufficiently to cause the shadow to move from one set of cross wires 16 to the other, the indicator 26 will move a definite distance over the dial 27.

The distance that the indicator 26 moves over the dial 27 is divided into any desired number of units, or "degrees" 28, the degrees being degrees of correction, and not necessarily degrees of arc. Sixteen degrees on the dial 27 may be fixed to represent the amount that the indicator 26 will move, while the shadow is passing from one set of cross wires 16 to the other, and the entire dial (which may be of any desired extent) is calibrated accordingly. The foregoing remarks regarding the relative relations of the cross wires 16 and the dial 27 of course relate to the theory and the manufacture of the instrument. The mere user does not need to concern himself with them.

Figure 10:
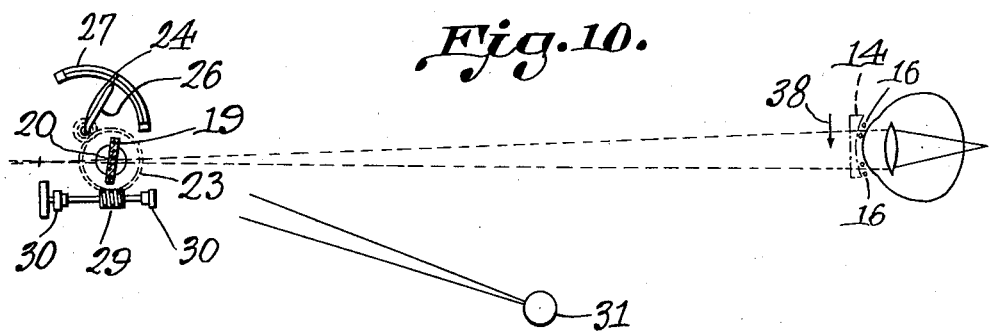
Figure 11:
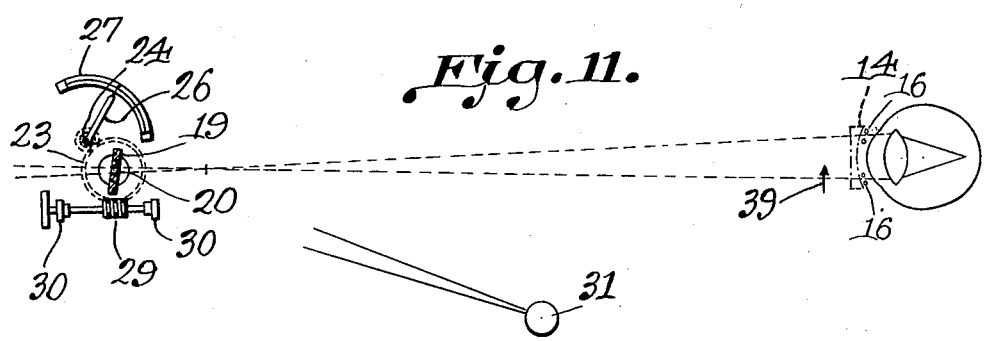

In Fig. 10, the diagram represents a hyperoptic eye, and the point of reversal is behind the mirror 19. In Fig. 11, the diagram represents a myoptic eye, and the point of reversal is ahead of the mirror 19. With the point of reversal subject to shifting movement, longitudinally of the axis of the sight tube 7, it is evident that a given amount of rotation of the tangent screw 29, and a consequent tilting of the mirror 19, will cause the shadow to move different amounts with respect to the cross wires 16: or, stated conversely, and with more regard to what takes place in the actual operation of the instrument, if the shadow is caused to move from one set of cross wires 16 to the other, a greater or less rotation of the tangent screw 29 will be required, and the indicator 26 will move over more or less of the units 28 on the dial 27.

Notwithstanding the foregoing somewhat elaborate explanation, the operation is simple. With the patient's eye at the eye-piece 12, and with the observer's eye at the sight hole 20 of the mirror 19, the tangent screw 29 is rotated until the shadow is brought up to one set of cross wires 16, as in Fig. 13, the position of the indicator 26 on the dial 27 is noted, and a reading is made. The shadow is moved to the position of Fig. 14, and on to the other set of cross wires 16, as in Fig. 15, and another reading of the indicator 26 on the dial 27 is made. Suppose that a comparison of these two readings shows that the indicator 26 has made an excursion over twenty of the units 28 on the dial 27. Recalling that sixteen of the units 28 on the dial 27 is the standard from which the computation is made, and letting X represent the correction in diopters, there results the simple equation:

$$16 : 1 = 20 : X,$$
$$16X = 20, \text{ and}$$
$$X = 1.25,$$

the correction being 1¼ diopters.

In the hyperoptic eye of Fig. 10, the shadow moves "with the mirror," as indicated by the arrow 38, in accordance with the well known principles of retinoscopy. In the myoptic eye of Fig. 11, the shadow moves "against the mirror" as indicated by the arrow 39. The operator, therefore, knows whether the correction is plus or minus.

Figure 13:
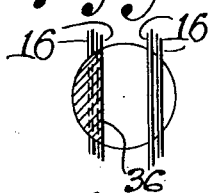
Figure 15:
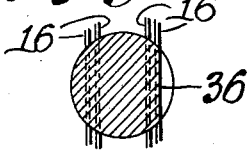
Figure 16:
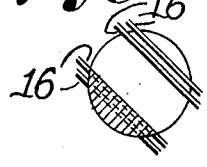
Figure 17:
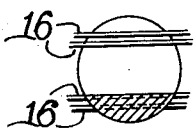

The primary position of the sight tube 7 is with the cross wires 16 vertical, or in the axis of 90, as shown in Figs. 13 to 15. After the described operation has taken place, with the cross wires 16 disposed as stated, the tube 7 is rotated on its axis until the cross wires 16 are horizontal, or at 180, as shown in Fig. 17, and the observations are repeated. If the findings are the same in the two principal meridians, the error is established as a spherical error. If the readings on the two principal meridians do not agree, the error is an astigmatic error. By rotating the tube 7, for instance to the position of Fig. 16, the axis of the astigmatism can be determined, and proper correction made. The cylindrical lens 14 is not inserted into the tube 7, until after the tube has been rotated on its axis to adjust the cross wires 16 with regard to the direction in which the shadow moves, and with regard to the axis in which the correction is to be made. In all operations that depend upon the amount that the tube 7 is rotated on its longitudinal axis, the position of the hand 9 of Fig. 6 on the scale 10 of the limb 11 will afford a reading in degrees of arc, thus establishing the axis of the refractive error. The reading afforded by the hand 9 is made before the cylindrical lens 14 is placed in position, and when the lens is in position the edge of the shadow will be rectified, as shown in Fig. 13 for instance. The effect of the lens 14 may be regarded as a constant, to be eliminated in the ultimate determination of the amount of refraction.

By having two parallel cross wires 16 in each of the sets, a more accurate observation of the margin of the shadow can be made than would be possible if there were but one cross wire in each set, since with two cross wires in each set, it is easier to determine when the shadow has crossed the first wire of that set by a minute amount, and begun to move toward the other cross wire of the same set.

The gear 23 and the pinion 24 form a multiplying train, giving large movement to the indicator 26, without having the indicator of great length.

Some operators may prefer to use a spherical lens of one or more diopters in addition to the cylindrical lens 14. The idea in mind in doing this is that the higher degrees of refractive error cast a denser shadow as the eclipse moves across the pupillary area, and the denser shadow may offer an additional advantage, through the case of discrimination which it would afford. The net result would be the same, since it would be necessary merely to take the strength of the spherical lens into consideration in computing the correction.

There is an advantage in having the scale 28 read in opposite directions from a zero point. Any point on the scale 28 may be selected as the zero point, and is established as such when the shadow is advanced toward the first set of wires. The point is then noted, and the amount travelled by the mirror is noted. This factor will apply when the shadow is moving in a reverse direction, as is the case in myopia of more than one degree. It is evident that the approximation of the shadow can be more readily accomplished when the shadow is advanced than when it recedes. The graduation of the scale 28 in opposite directions will provide a means of measurement either in the case of an advancing shadow or a receding shadow.

What is claimed is:

1. In an instrument of the class described, a rotatably mounted sight tube, a mirror at the observer's end of the sight tube and having a sight hole, means for mounting the mirror for lateral tilting movement, to produce a shadow, spaced pairs of parallel cross wires carried by the distal end of the sight tube and forming a datum to which the movement of the shadow is referred, as the shadow makes its lateral excursion, responsive to the tilting of the mirror, the pairs of wires being so placed that their image is superimposed on the pupilary area, the pairs of wires permitting an accurate adjustment of the shadow and affording an opportunity for obtaining a true alinement of the meridian upon a rotation of the sight tube, and mechanism for indicating the extent of the lateral excursion of the shadow as it moves from one cross wire to the other.

2. The instrument of claim 1, in combination with means for increasing the refractive equation, intensifying the shadow, and making interpretation more distinct and accurate, said means comprising a cylindrical lens disposed adjacent to the patient's end of the sight tube, and constituting means for rectifying the edge of the shadow from crescentic form to right line parallelism with respect to the cross wires, thereby promoting the observation of the transit of the shadow with respect to the cross wires.

3. The instrument of claim 1, further characterized by the fact that said mechanism embodies a dial, an indicator cooperating with the dial, means for mounting the indicator for movement with respect to the dial, means for connecting the indicator operatively with the mirror, and means under the control of an operator for tilting the mirror and simultaneously actuating the indicator.

4. The instrument of claim 1, in combination with a support whereon the sight tube is journaled for rotary adjustment about a longitudinal axis, and means for indicating the amount of rotary adjustment imparted to the sight tube, said means comprising relatively movable cooperating parts secured respectively to the support and to the sight tube in definite and fixed relationship with respect to the cross wires and the mirror.

WILLIAM R. MORRISON.